(12) United States Patent
Ballagh et al.

(10) Patent No.: US 9,620,084 B2
(45) Date of Patent: *Apr. 11, 2017

(54) METHOD AND APPARATUS OF GRAPHICAL OBJECT SELECTION IN A WEB BROWSER

(75) Inventors: Jonathan B. Ballagh, Boulder, CO (US); Thomas E. Fischaber, Golden, CO (US); Roger B. Milne, Boulder, CO (US); Krista M. Marks, Boulder, CO (US)

(73) Assignee: Disney Enterprises, Inc., Burbank, CA (US)

( * ) Notice: Subject to any disclaimer, the term of this patent is extended or adjusted under 35 U.S.C. 154(b) by 1466 days.

This patent is subject to a terminal disclaimer.

(21) Appl. No.: 13/308,191

(22) Filed: Nov. 30, 2011

(65) Prior Publication Data

US 2012/0079390 A1    Mar. 29, 2012

Related U.S. Application Data

(63) Continuation of application No. 11/956,096, filed on Dec. 13, 2007, now Pat. No. 8,091,030.

(60) Provisional application No. 60/870,028, filed on Dec. 14, 2006.

(51) Int. Cl.
| | | |
|---|---|---|
| *G09G 5/14* | (2006.01) | |
| *G06F 3/048* | (2013.01) | |
| *G06T 11/60* | (2006.01) | |
| *G06T 11/00* | (2006.01) | |
| *G06T 15/50* | (2011.01) | |
| *G06F 3/0481* | (2013.01) | |

(52) U.S. Cl.
CPC .............. *G09G 5/14* (2013.01); *G06F 3/0481* (2013.01); *G06T 11/00* (2013.01); *G06T 11/60* (2013.01); *G06T 15/503* (2013.01); *G06F 2203/04804* (2013.01); *G09G 2340/12* (2013.01)

(58) Field of Classification Search
CPC ......... G06F 2203/04804; G06F 3/0481; G06T 11/00; G06T 11/60; G06T 15/503; G09G 2340/12; G09G 5/14
See application file for complete search history.

(56) References Cited

U.S. PATENT DOCUMENTS

| | | | | |
|---|---|---|---|---|
| 5,377,314 A | * | 12/1994 | Bates et al. ................... | 345/634 |
| 5,574,840 A | * | 11/1996 | Kwatinetz et al. ........... | 715/272 |
| 5,669,006 A | * | 9/1997 | Joskowicz et al. ........... | 715/202 |
| 5,687,306 A | * | 11/1997 | Blank ........................... | 345/634 |

(Continued)

*Primary Examiner* — Andrea Long
(74) *Attorney, Agent, or Firm* — Farjami & Farjami LLP

(57) ABSTRACT

Various approaches for selection of graphical objects in a web browser-based application are described. In one approach, a selection overlay is stored in a web document. The selection overlay encompasses a plurality of user-selectable graphical objects in the web document occupies a highest position in layers of graphical objects in the web document and includes a plurality of selection regions. Each selection region is respectively associated with one of the plurality of graphical objects and defines a region of selectability for the associated graphical object. In response to the web browser-based application detecting entry of a user-directed pointer into one of the selection regions in the selection overlay, the graphical object associated with the one selection region is selected for user manipulation and displayed.

17 Claims, 9 Drawing Sheets

(56) References Cited

U.S. PATENT DOCUMENTS

| | | | |
|---|---|---|---|
| 5,754,177 A * | 5/1998 | Hama et al. | 715/862 |
| 5,757,358 A * | 5/1998 | Osga | 715/862 |
| 5,808,601 A * | 9/1998 | Leah et al. | 715/856 |
| 6,018,333 A * | 1/2000 | Denber | 715/790 |
| 6,088,708 A * | 7/2000 | Burch et al. | 715/229 |
| 6,374,272 B2 * | 4/2002 | Bates et al. | 715/207 |
| 6,567,070 B1 * | 5/2003 | Light et al. | 345/157 |
| 6,999,104 B2 * | 2/2006 | Komagata | 345/629 |
| 7,000,197 B1 * | 2/2006 | Bou et al. | 715/812 |
| 7,310,779 B2 * | 12/2007 | Carro | 715/763 |
| 2002/0023110 A1 * | 2/2002 | Fortin et al. | 707/513 |
| 2002/0052891 A1 * | 5/2002 | Michaud et al. | 707/501.1 |
| 2002/0175923 A1 * | 11/2002 | Lin et al. | 345/629 |
| 2003/0037304 A1 * | 2/2003 | Burky | 715/532 |
| 2003/0184576 A1 * | 10/2003 | Vronay | G06F 3/04815 715/719 |
| 2004/0261037 A1 * | 12/2004 | Ording et al. | 715/788 |
| 2005/0268234 A1 * | 12/2005 | Rossi et al. | 715/705 |
| 2006/0089843 A1 * | 4/2006 | Flather | 705/1 |
| 2007/0266170 A1 * | 11/2007 | Mockett | 709/231 |
| 2008/0131010 A1 * | 6/2008 | Wilensky | 382/238 |
| 2008/0250054 A1 * | 10/2008 | Nickel | G06F 17/30306 |
| 2009/0004410 A1 * | 1/2009 | Thomson et al. | 428/29 |
| 2009/0259935 A1 * | 10/2009 | Kramer et al. | 715/234 |

\* cited by examiner

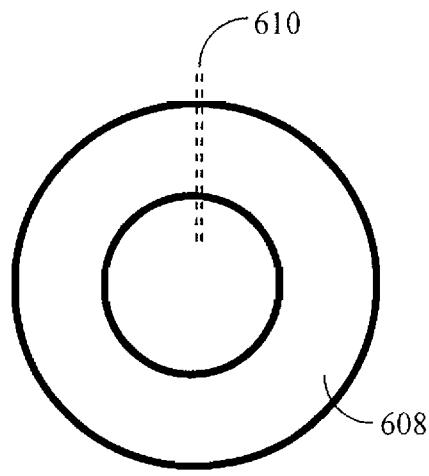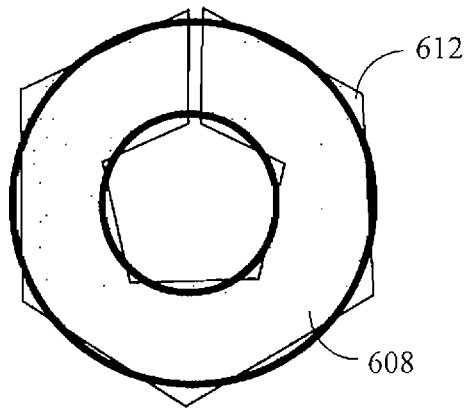
FIG. 6d    FIG. 6e
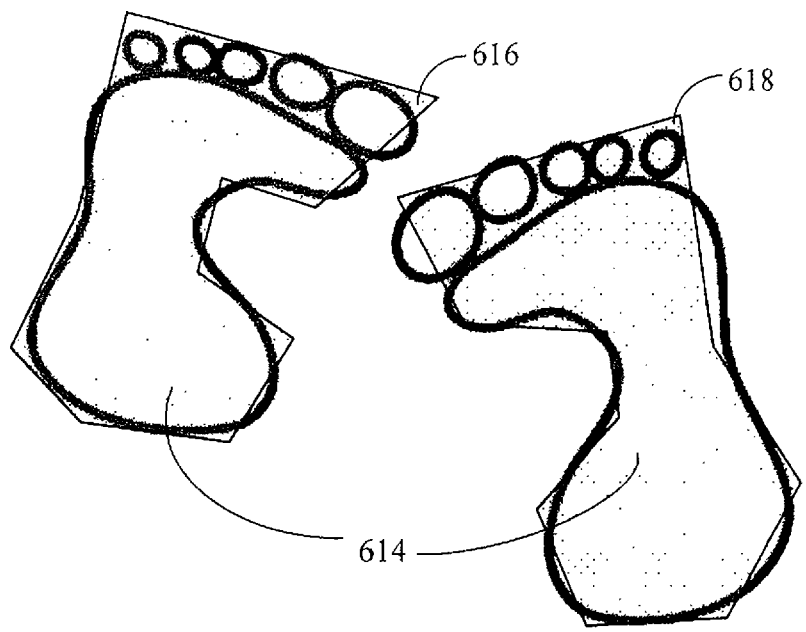
FIG. 6f

METHOD AND APPARATUS OF GRAPHICAL OBJECT SELECTION IN A WEB BROWSER

RELATED PATENT DOCUMENTS

This application is a Continuation of U.S. patent application Ser. No. 11/956,096, filed on Dec. 13, 2007 now U.S. Pat. No. 8,091,030.

This patent document claims the benefit, under 35 U.S.C. §119(e), of U.S. Provisional Patent Application No. 60/870,028, filed Dec. 14, 2006 and entitled: "METHOD AND APPARATUS OF GRAPHICAL OBJECT SELECTION IN A WEB BROWSER," which is fully incorporated herein by reference.

TECHNICAL FIELD

This present invention relates generally to the use and production of graphical user interfaces (GUIs). More specifically, the invention relates to methods for enabling finer-grain discrimination and selection of graphical objects from within web browser program environments without additional utility from separate web browser plugins.

BACKGROUND

Graphical user interfaces (GUIs) have become very popular in providing users of computers, particularly users of computers with a mouse or other input pointer devices, with access to computer software, including menus, software options, desktop components, images and other graphical objects. WINDOWS XP®, by Microsoft Corporation, of Redmond Wash., and MAC OS X®, by Apple Computer, of Cupertino Calif., are popular computer operating system implementations that allow users to interact and manipulate desktop software (e.g., word processing, graphic design, presentation software and web browsers) using a variety of graphical components. Those knowledgeable in the art will understand that a graphical component may be displayed visually to users as at least one image displayed on a computer monitor.

In recent years, there has been a tremendous proliferation of computers connected to a global network known as the Internet. The Internet provides a transport mechanism through standardized communication protocols, such as the Hypertext Transport Protocol (HTTP), for communicating web content in the form of text, graphics, sounds, animations, video, and computer executable code.

A web browser is a client application or operating system utility that communicates with server computers via FTP, HTTP, and Gopher protocols. Examples of popular web browsers include INTERNET EXPLORER®, by Microsoft Corporation, of Redmond Wash., and FIREFOX™, by Mozilla Corporation, of Mountain View, Calif. Web browsers conventionally receive electronic documents from the network and present them to a user. In addition to being able to display text, web browsers are also typically able to display graphics and other multimedia content (e.g., video, audio, vector graphics, and vector graphic animations). Electronic documents may include text documents, conventional markup documents (e.g. HTML, XML, and others), graphics and other multimedia content, data files, and code that can be executed or interpreted by the web browser or other system components.

In addition to data and metadata, HTML documents can contain embedded software components containing program code that perform a wide variety of operations. These software components expand the interactive ability of an HTML document's user interface. FLASH® (plus ACTIONSCRIPT®) JAVASCRIPT™, and VBSCRIPT™ scripts are examples of software components that are embedded in HTML documents. A browser executes each script as it reaches the position in the script during interpretation of the HTML document. Scripts loaded during interpretation of the document may modify the document if the browser supports dynamic HTML (DHTML). Scripts may respond to user activity (pointer events or keyboard events), may post data to the server, and may request and receive data from the server. In recent years, GUIs have been implemented inside of web browsers using software embedded in electronic documents and transmitted from server to client over the Internet. Such mechanisms can, for example, use JAVASCRIPT and DHTML capabilities, or ACTIONSCRIPT and FLASH capabilities, and are well understood by those skilled in the art.

Techniques and popular conventions for managing graphical objects are well known by those skilled in the art of modern computer desktop usage. For example, in a windows-based environment such as that provided by WINDOWS XP, a desktop window object may be resized by clicking near the window border using a user input pointer, controlled by, for example, a mouse, and dragging the user input pointer to a different screen location in order to specify new window dimensions.

Until recently, the ability to manipulate and interact with graphically robust environments was limited to traditional desktop-based applications. As web browser applications become increasingly sophisticated, much of the functionality previously reserved for desktop-based applications is now being migrated to the browser-based applications. Using techniques widely known by those with normal skill in the art (for example, through asynchronous JAVASCRIPT and XML (AJAX), and DHTML), graphical-based desktop functionality can be programmed into web browser applications and delivered over the Internet. For example, Google, Incorporated, of Mountain View, Calif., offers browser-based word processing and spreadsheet applications with robust graphical user interfaces to allow users to create and edit documents on the Internet.

Techniques and conventions for interacting and manipulating graphical images in web browser programs often employ controls that are similar to those used by desktop software applications. Users often select graphical objects for manipulation, for example, by moving a user input pointer into the region of the object and clicking the input pointer to initiate the selection and manipulation process.

More than one graphical object may be displayed in a web browser at a given instance. These graphical objects may be positioned on the display such that one or more graphical objects partially or fully overlap another graphical object. In these instances, it is of particular interest how the web browser software discriminates, and the granularity at which the discrimination is made, between two or more overlapping graphical objects during the process of graphical object selection.

Prior art graphical object selection techniques in web browser programs often employ rectangular bounding boxes around the perimeter of graphical object images (for example, raster images in the JPEG, GIF, and bitmap formats, and vector images in the form of SVG, to name a few) to define the object selection granularity. These bounding boxes define the image selection region for their respective graphical objects, meaning a graphical object may be selected for manipulation when the user input device pointer is within, or clicks within, the perimeter of a bounding box.

Two-dimensional computer-aided design and graphic arts programs ("graphics applications"), such as VISIO® and MICROSOFT OFFICE (Word, Power Point), by Microsoft Corporation, of Redmond, Wash., and ADOBE ILLUSTRATOR, by Adobe Systems Incorporated, of San Jose, Calif., generally allow users to organize their designs and artwork into layers, more or less analogous to sheets of acetate bound together. Each object on a layer has a stacking order such that objects can be on top of one another. Similarly, layers are also stacked on top of one another to form the final work. The final work is rendered as a two dimensional design to be viewed on a video display, printed, etc. To the extent that one or more graphical objects are layered over other graphical objects, some graphical objects may be partially or fully occluded in the rendered two-dimensional design. Programs conventionally provide a mechanism to reorder object layering (e.g. via menu controls to "bring to front", "send to back", etc.). Some programs also provide a "layers palette"—a taxonomical tree of the layer identifiers—allowing the user to select the layer on which to draw, reorder the layers by dragging and dropping them with the mouse, and move art from one layer to another.

Controls and techniques associated with graphical object selection may employ a layering scheme when a plurality of objects is present on the same computer display. In situations where two or more graphical objects overlap on the screen, the rectangular bounding box selection granularity techniques used by prior art may make it difficult to select the desired graphical object.

Although raster images are in fact rectangular in nature (that is, they have height and width dimensions), the bounding-box selection regions used by prior art may overly approximate the actual useful selection region of a graphical object, since the visible region of the displayed object may be non-rectangular. Those of ordinary skill in the art of graphic design will understand that this is possible when a raster image contains both transparent and non-transparent pixels.

For example, a raster image of a circle may define the circle portion of the image using non-transparent pixels, while using transparent pixels to represent the remaining portions of the image within a rectangular bounding box. Because the selection region bounding box includes both the transparent and non-transparent pixels, it is possible to select the circle graphical object by selecting within the bounding box at a point containing transparent pixels (that is, at a point outside of the circle portion). It may be useful to limit the selection region of a graphical object to visible image areas represented by non-transparent pixels, such as circumstances when there are overlapping graphical objects displayed on the same user output screen. Prior art fails to provide a mechanism for supporting said limited selection capabilities.

Although techniques for object selection are well known to those skilled in the art, these methods of object selection may be difficult and frustrating when a user attempts to select an object that is not rectangular in shape, when conventional bounding box mechanisms are used. Frustration may also arise when a user attempts to select a single object from multiple objects displayed within an area of computer display that are in the state of object overlap or occlusion. These controls may also be non-intuitive and difficult to learn for inexperienced users.

There may also be considerable discovery involved with finding and learning how these controls function in a foreign or new environment, which may cause significant frustration for new users.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1c shows two graphical objects, with the smaller graphical object fully occluded by the larger graphical object;

FIG. 6d is a view of a graphical object whose visible region is not simply connected;

FIG. 6e is a view of a graphical object whose visible region is not simply connected, with approximation by a single polygonal region which is simply connected;

FIG. 6f is a view of a graphical object with a plurality of non-connected visible regions, and a polygonal approximation to the same by a plurality of polygons;

DETAILED DESCRIPTION

Figure 1A:
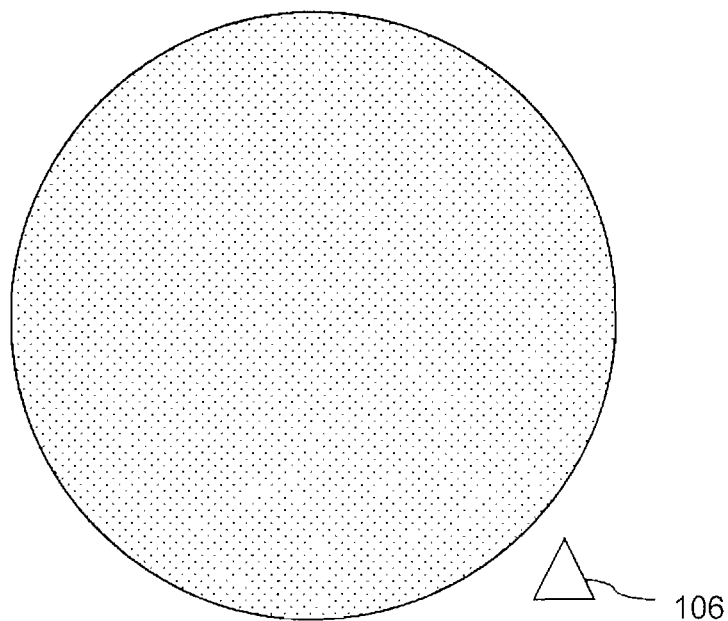
FIG. 1a shows a graphical object inside a bounding-box that defines a selection region for the graphical object.

The embodiments of the present invention are now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing embodiments of the invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

It will be recognized by those with ordinary skill in the art that the inventive GUI methods described in this invention may be programmed in a software language such as C++, JAVA, JavaScript, Visual Basic, HTML or other languages. The objects within the GUIs may be selected and manipulated by a user of the software using an input device, such as a mouse, touch sensitive pad, or other mechanism.

The embodiments of the present invention allow easy discrimination and selection of graphical objects when a plurality of graphical objects is present in a web browser based application. The embodiments of the invention allow inexperienced users with little or no computer knowledge to perform graphical object selection, while also maintaining a level of usability and flexibility preferred by those already skilled in the art of modern computer use. Moreover, the embodiments suggest a selection mechanism capable of discriminating between different graphical objects when one or more graphical objects partially or fully occludes one or more other graphical objects.

The term "graphical object" is used broadly herein to include any graphical object that may be displayed to users on an output display screen using at least one graphical image, including but not limited to, desktop windows, raster images in a web browser, desktop publishing images, clip art, icons, and user toolbars to name a few. Such use of this term should be easily understood by those with normal skill in the art.

Figure 7:
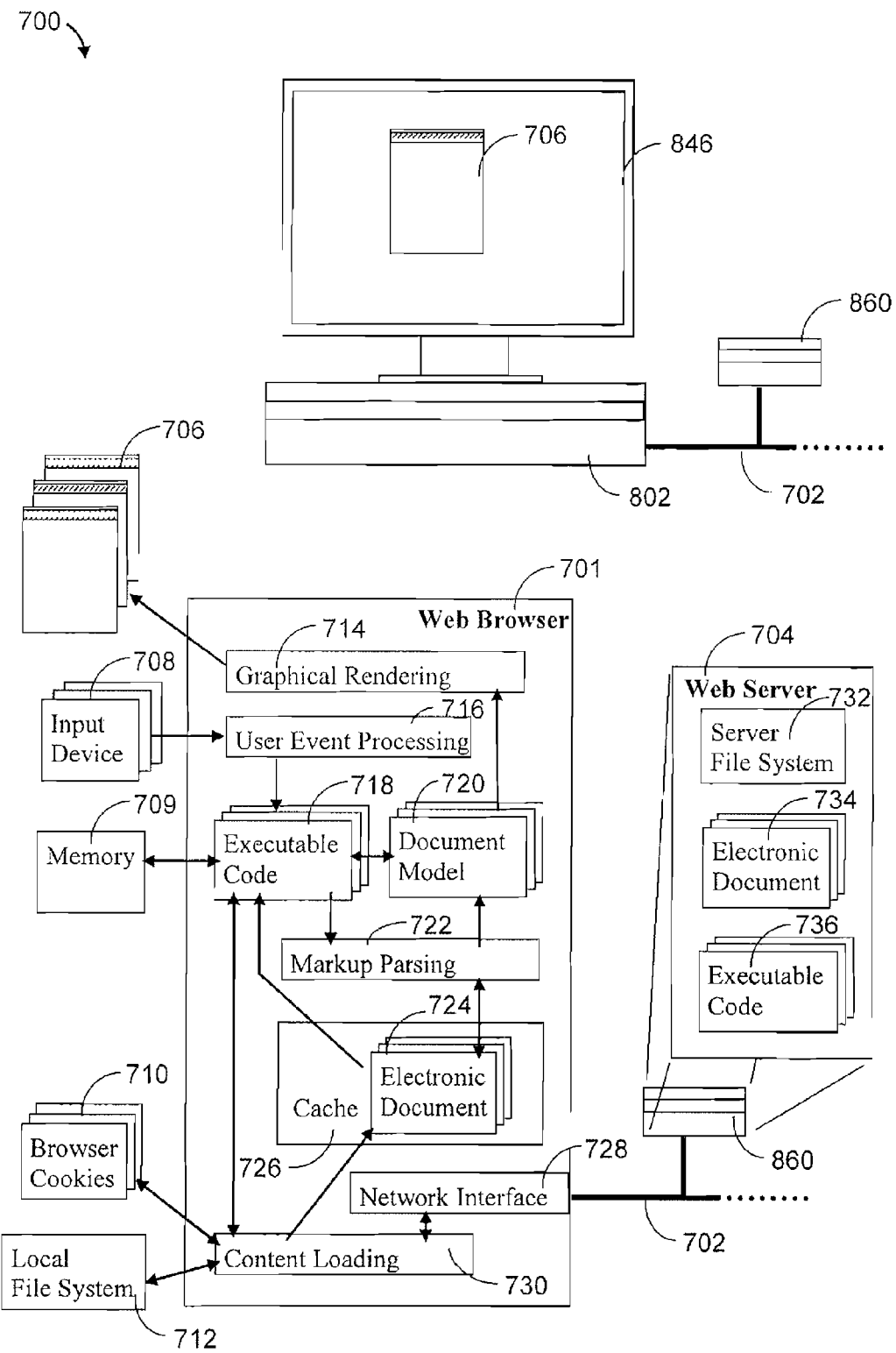
FIG. 7 illustrates an example web-browser application environment in which the present invention can function.

The term "web browser based application" and the like is used broadly herein to include any interactive content that has any aspect of a user interface that can be accessed via a web browser 701 (FIG. 7). Such use of this term should be easily understood by those with normal skill in the art.

FIG. 1a depicts a graphical object 102 that may be displayed inside the graphical user interface of a web browser based application. Graphical object 102 is enclosed by bounding box 104, which defines the minimal image selection region for graphical object 102 in web browser based applications in the prior art. Graphical object 102 may be displayed using both transparent and non-transparent pixels; with non-transparent pixels used to represent the circle portion of the image, and transparent pixels used to represent the remaining portion of the image inside bounding box 104. Traditional (prior art) methods for selecting graphical object 102 include moving a user input pointer device inside bounding box 104 and clicking a user input pointer device inside bounding box 104.

Figure 1B:
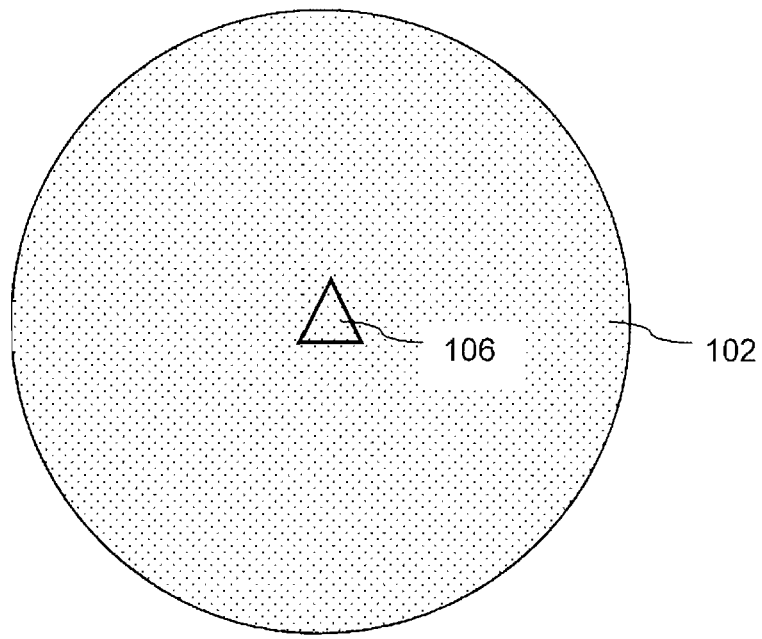
FIG. 1b shows two graphical objects, with the smaller graphical object residing within the perimeter of the larger graphical object's bounding-box, highlighting the importance of being able to discriminate correctly between the two objects during the graphical object selection process.

FIG. 1b shows a graphical scene containing two graphical objects, a resized graphical object 102, and a smaller graphical object 106 enclosed in a bounding box 108. In traditional web browser applications, graphical object selection methods employed by prior art would fail to allow graphical object 106 to be selected by a user, given the example arrangement and object positioning. For example, if the stacking order is such that graphical object 106 is behind graphical object 102, graphical object 106 could not be selected because its bounding box region 108 is subsumed by bounding box 104. Because the region outside of graphical object 102 is displayed using transparent pixels, graphical object 106 would also be visible when displayed in a web browser, even though the object is within graphical object 102's bounding box 104.

FIG. 1c shows a graphical scene containing two graphical objects, graphical object 102 and a smaller graphical object 106. Graphical object 106 is behind graphical object 102 in stacking order, and is therefore fully occluded by graphical object 102. Using image selection techniques commonly employed in prior art, users will not be able to select graphical object 106.

Figure 2:
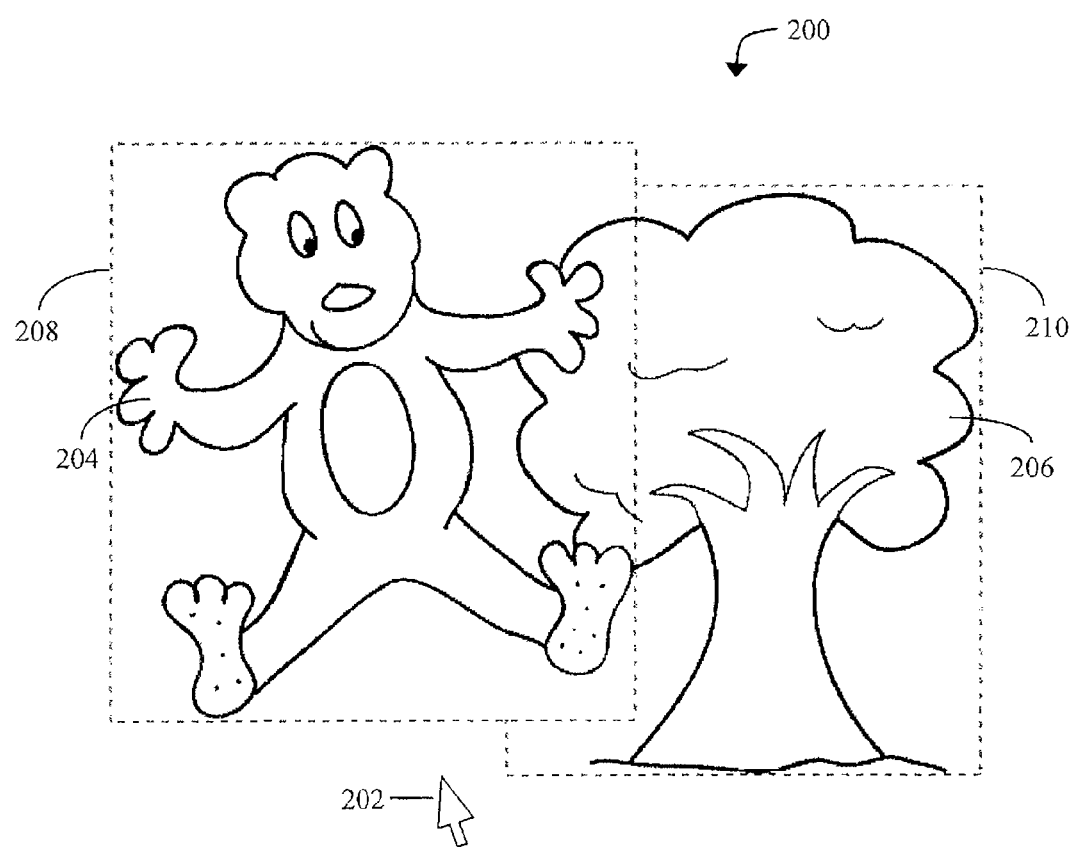
FIG. 2 is a view of a graphical user interface, including two graphical objects, which are selectable via rectangular selection region bounding-boxes.

FIG. 2 illustrates a web browser based application interface 200 comprising a user input pointer 202 and graphical objects 204 and 206. Rectangular bounding box 208 bounds graphical object 204, and rectangular bounding box 210 bounds graphical object 206. Bounding boxes 208 and 210 define the typical image selection region for objects 204 and 206, respectively. Input pointer 202 is shown inside of screen region 200 but outside of the bounding boxes 208 and 210 of graphical objects 204 and 206, respectively. Graphical object 204 is layered in front of graphical object 206. Therefore, graphical object 204 and its rectangular bounding box 208 appear on the screen in front of graphical object 206. The portions of graphical object 206 and its bounding box 210 that are underneath bounding box 208 will not be selectable by the user.

Figure 8:
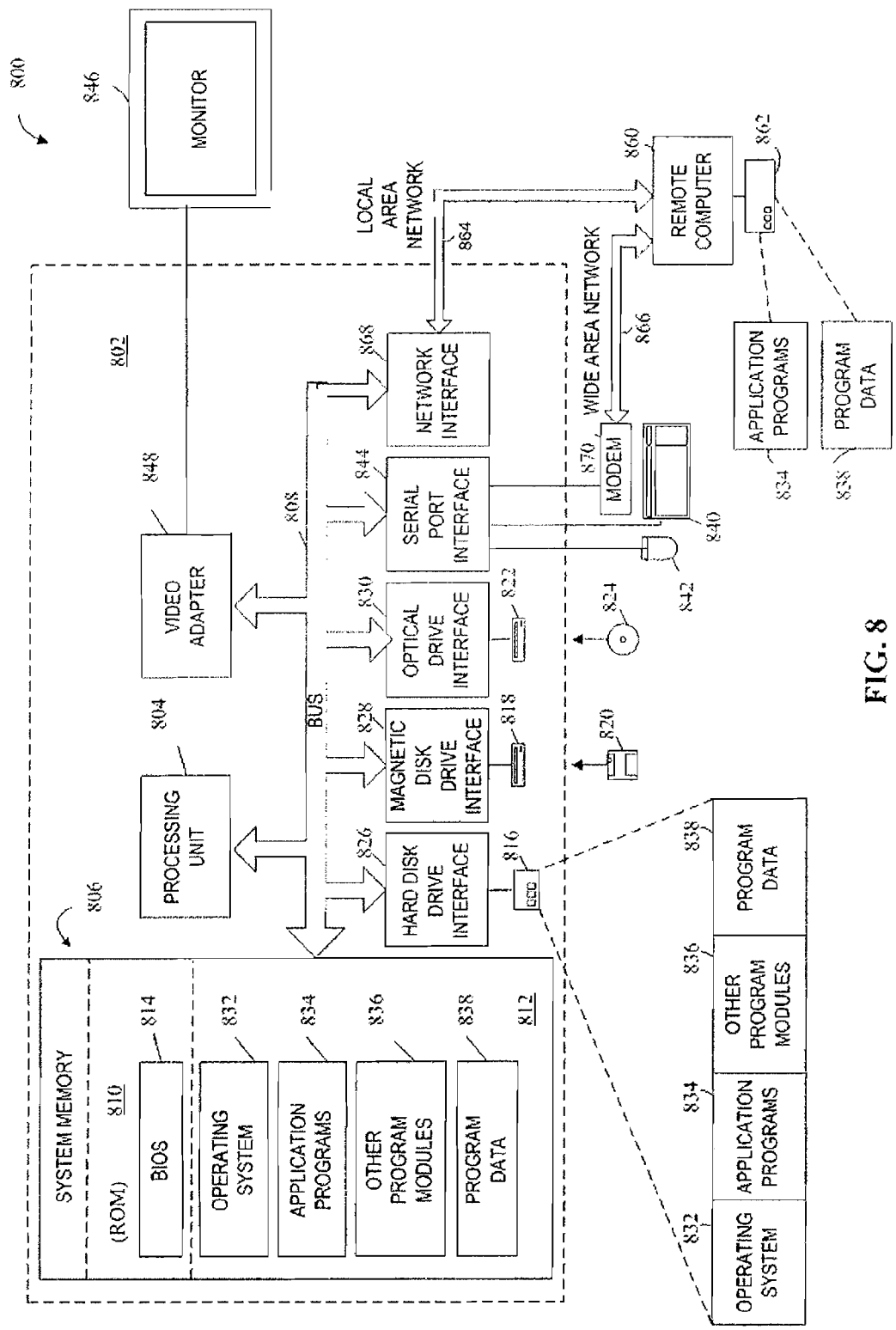
FIG. 8 is a block diagram of a general purpose computer system for an environment in which the present invention can function.

Embodiments of the present invention are now described to give details of example implementations and to illustrate their utility in the selection of graphical objects, such as graphical object 206, in a web browser based application. In such an embodiment, pointer position, pointer motion, and input events such as a pointer button press can all be tracked by browser executable code 718 (FIG. 7)., e.g., JAVASCRIPT. Detection of the entry and exit of the pointer into certain regions can be embodied in multiple ways. In one embodiment, the browser can be instructed to call a JAVASCRIPT function or other code each time the pointer moves to a new location. The called function can then determine whether the current pointer motion represents any event of interest to the present invention, as described above. Such an embodiment may be computationally expensive and slow to execute on client computer 802 (FIGS. 7-8). In a second embodiment, the entry/exit of the pointer to/from regions of interest can be tracked by using existing elements in a document model 720 (FIG. 7), DOM (or the like), or non-visible elements added to the DOM (or the like) for this purpose, and assigning to such elements script functions (of code 718) that are to be executed when the pointer enters or leaves certain screen regions that they specify.

Of such embodiments, one embodiment of the present invention provides a mechanism for object selection from one or more graphical objects on a user display, using a selection overlay that may be generated or otherwise created using information from some or all of the graphical objects present on the display. An embodiment of this invention uses an overlay that may be generated or otherwise created from information related to the graphical objects present on the display. In an embodiment of the present invention, the overlay may comprise an IMAGEMAP element in a web browser based application, which may be loaded as a new markup language document or inserted directly into the document object model (DOM) of document models 720. Moreover, the selection overlay may comprise zero or more map regions, each containing a reference to an individual graphical object and defining a selection region which may be selected individually from other map regions. The selection regions may be implemented using DOM AREA elements that specify screen coordinates within screen areas occupied by said imagery in order to define shapes that approximate the area of associated graphical object images. The shape information may include a plurality of geometric shapes including circles, triangles, rectangles, or polygons, and those skilled in the art will understand how such shapes can be used to define the desired selection regions of the associated graphical objects. Those knowledgeable in the art of web browser based applications will understand the terms IMAGEMAP, AREA elements, markup language document, and DOM. Those knowledgeable in the art of web browser based applications will also understand that an IMAGEMAP allows a plurality regions or images to be independently selected from within a single IMAGEMAP, through a plurality of contained AREA elements.

In modern web browser applications, IMAGEMAP elements are associated with a specific image object in the web browser and are most typically used to hyperlink areas of the image object to a plurality of destinations, or to attach callback functions to areas of said image object. The IMAGEMAP is typically defined by a set of coordinates, which may comprise polygons or other geometric shapes that specify the areas of interest within the image. In this manner, it is possible to have an image in the web browser application that is partitioned into a plurality of AREAs, with each AREA defined by a set of coordinates, and each AREA associated with a unique hyperlink or callback function that is invoked in response to a user interface event (for example, mouse-over, mouse-click, to name a few).

Although an IMAGEMAP itself may be partitioned into separate AREAs (prior art), the IMAGEMAP typically occupies the full width and height of the image object it is attached to. In the case when one or more IMAGEMAPs overlap on the user display, the IMAGEMAP highest in the stacking order is often given selection priority over IMAGEMAPs that reside lower in the stacking order. That is, if an AREA element belonging to a first IMAGEMAP is fully occluded by a second IMAGEMAP that is higher in the image stacking order, a user may be unable to select said IMAGEMAP AREA. This IMAGEMAP AREA will not be selectable when covered by the second IMAGEMAP, even if the second IMAGEMAP contains no IMAGEMAP AREAs that overlap the first said IMAGEMAP AREA of first IMAGEMAP. Thus, an approach that attaches separate IMAGEMAPs to individual image objects will be partially limited to an image bounding box selection granularity in cases where multiple IMAGEMAPs overlap. It is often therefore more desirable to employ a single IMAGEMAP overlay that encompasses all selection regions to achieve the desired selection granularity, as may be done in various embodiments of the present invention.

The selection overlay may be added to the DOM such that the overlay receives selection priority over all other graphical objects within a desired region. This may be realized by adding the selection overlay as the top-most layer in the web browser based application, relative to other graphical objects whose selection regions are contained in said overlay. In one method of overlay creation, a selection overlay may be created by first instantiating a fully transparent image that encompasses all possible user selection regions, or all of web browser screen region 200, and is added as the highest element in the browser stacking order. Use of a fully transparent image means that the image will not be visually apparent to users. By attaching an IMAGEMAP to the transparent image, an overlay selection region is created that spans all possible selection regions, or all of web browser screen region 200.

Figure 5:
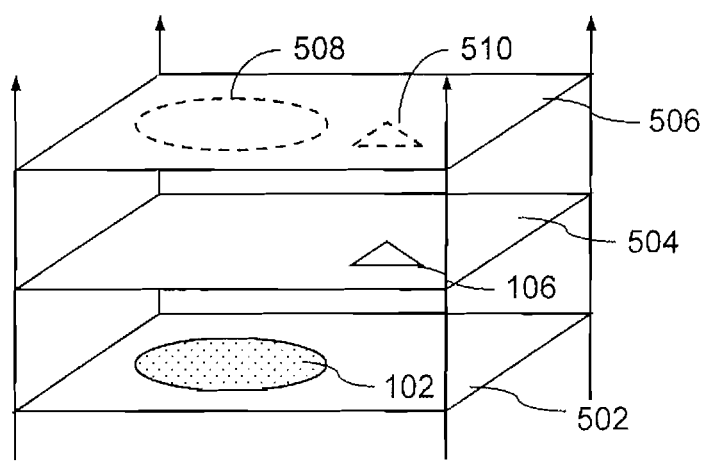
FIG. 5 is a view of a layering technique that may be used by an embodiment of the present invention, with a first graphical object on the first layer, a second graphical object on the second layer, and an overlay layer on the top-most layer containing map regions for first and second graphical objects.

For example, FIG. 5 depicts a web browser application containing two graphical objects in separate layers, in addition to an overlay layer. Layer 502 is the bottom-most layer, and contains a first graphical object 102. Layer 504 is on top of layer 502, and contains a second graphical object 106. Layer 506 is the top-most layer, and represents the selection overlay. Overlay layer 506 contains two AREA elements, 508 and 510, that approximate graphical objects 102 and 106, respectively. Note that AREA element 508 may be defined by a circle shape, and defined by a center coordinate plus radius. Also note that AREA element 510 may be defined by a polygon shape, defined by three coordinates pairs in this example. Though AREA elements 508 and 510 are simplistic examples, more complex shapes, for example, non-convex polygons, may be derived to approximate the area associated with graphical objects.

In one embodiment of the present invention, polygon approximations may be derived for a graphical object, and may be computed as functions of variables including, but not limited to, error tolerances, limits on polygon complexity (e.g., number of edges, etc.). Those knowledgeable in the art will appreciate that polygon approximations may be obtained for a graphical object using algorithms that have been extensively researched by computer scientists. Moreover, the coordinates associated with approximation need only be calculated once, and normalized coordinates may be stored as attributes on the graphical objects.

Figure 6A:
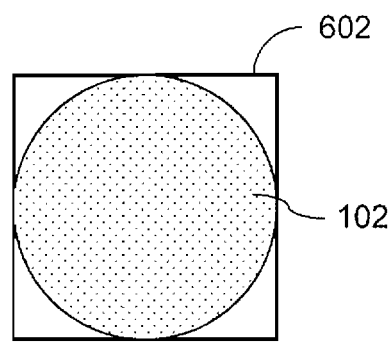
FIG. 6a is a view of a graphical object image bounded by a four-sided polygon approximation applied as the image selection region.
Figure 6B:
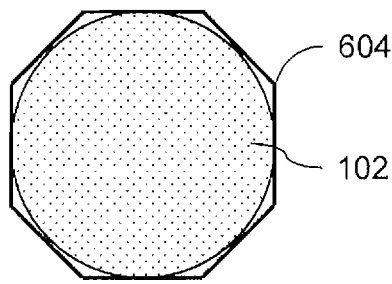
FIG. 6b is a view of a graphical object image bounded by an eight-sided polygon approximation applied as the image selection region.
Figure 6C:
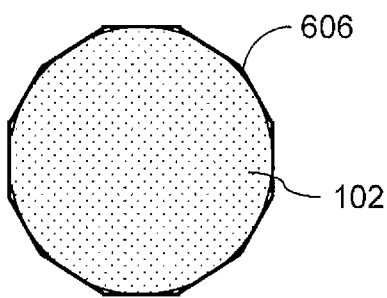
FIG. 6c is a view of a graphical object image bounded by a twelve-sided polygon approximation applied as the image selection region.

FIGS. 6a-6c show the same graphical object 102 with three different polygon approximations of the graphical object perimeter. In FIG. 6a, the polygon approximation for graphical object 102 is rectangle 602, and of the three approximations shown, FIG. 6a shows the arrangement that results in the greatest error between approximation 602 and graphical object 102. In FIG. 6b, polygon approximation 604 for graphical object 102 has eight sides, and the error between approximation 604 and graphical 102 is considerably less than the error in FIG. 6a. Polygon approximation 606 for graphical object 102 is shown with twelve sides, and has the least amount of error of the three configurations.

FIG. 6d shows a graphical object 608 whose non-transparent regions (indicated by gray shading) form a torus. Those skilled in the art will understand that the non-transparent regions of graphical object 608 illustrate a basic example of what in planar geometry are known as non-simply connected regions. FIG. 6e shows a polygonal approximation to the said non-simply connected region by a single polygon 612. Those skilled in the art will understand that polygon 612 can be constructed by determining a cut line 610 and using said cut line to transform region 608 into a simply connected region.

FIG. 6f shows a graphical object 614 that represents a pair of footprints and whose non-transparent regions form more than two disjoint (non-connected) regions. Also illustrated in FIG. 6f is a pair of polygons, polygon 616 and polygon 618 that may be constructed by an embodiment of the present invention as the selection regions for graphical object 614. Those skilled in the art will understand that the partitioning of graphical object regions into an approximation by a plurality of polygons can be accomplished by algorithms well known in the art.

In an embodiment of the present invention, selection regions for a graphical object may be determined by a thresholding of image pixel transparency followed by zero or more interleaved application of image erosion or image dilation. Such thresholding, erosion, and dilation algorithms will be well known to those skilled in the art. Erosion and dilation may be used to extend or constrict selection regions and/or to eliminate or merge small selection islands, isthmuses, or peninsulas.

Figure 3:
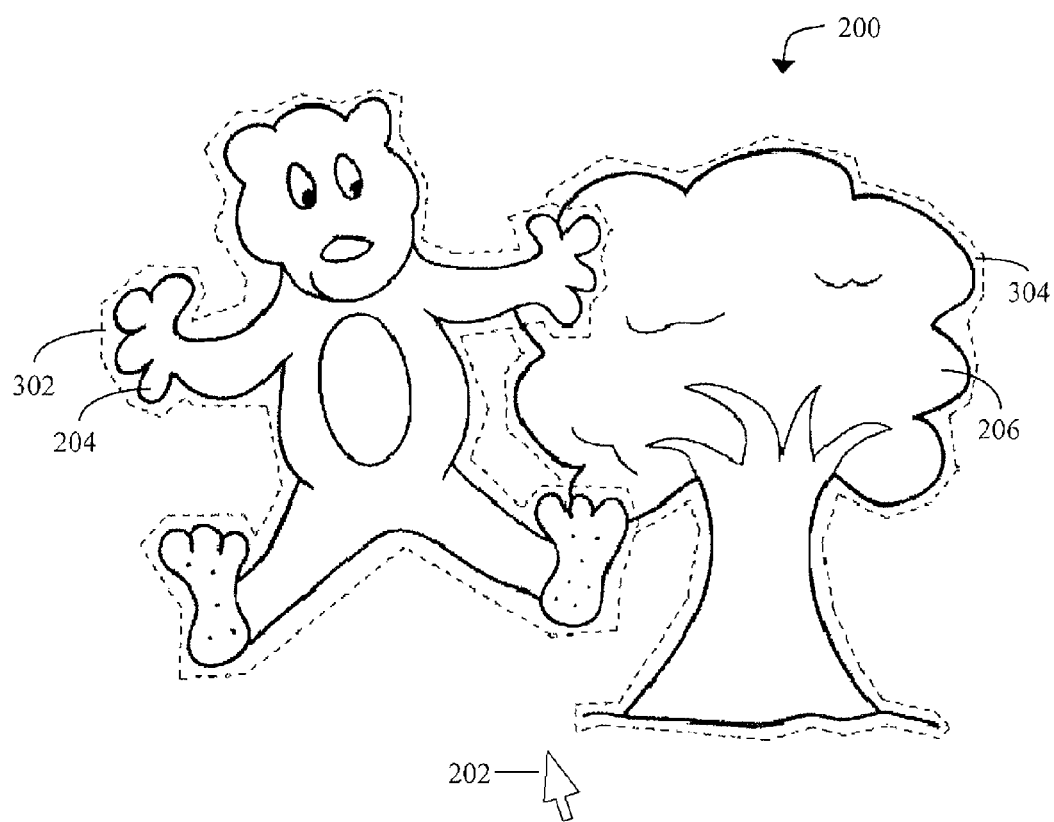
FIG. 3 is a view of the same graphical user interface including graphical objects and their respective finer-grained selection regions as might be created by an embodiment of the present invention.

FIG. 3 illustrates the utility of using selection regions defined by polygon approximations to improve upon the coarse-grained granularity of the bounding box approach shown in FIG. 2. Here bounding boxes 208 and 210 have been replaced by polygon approximation-based selection regions 302 and 304, respectively. Graphical object 204 may be selected when pointer 202 enters the screen region interior to polygon 302, and graphical object 206 may be selected when pointer 202 enters the screen region interior to polygon 304.

Figure 4:
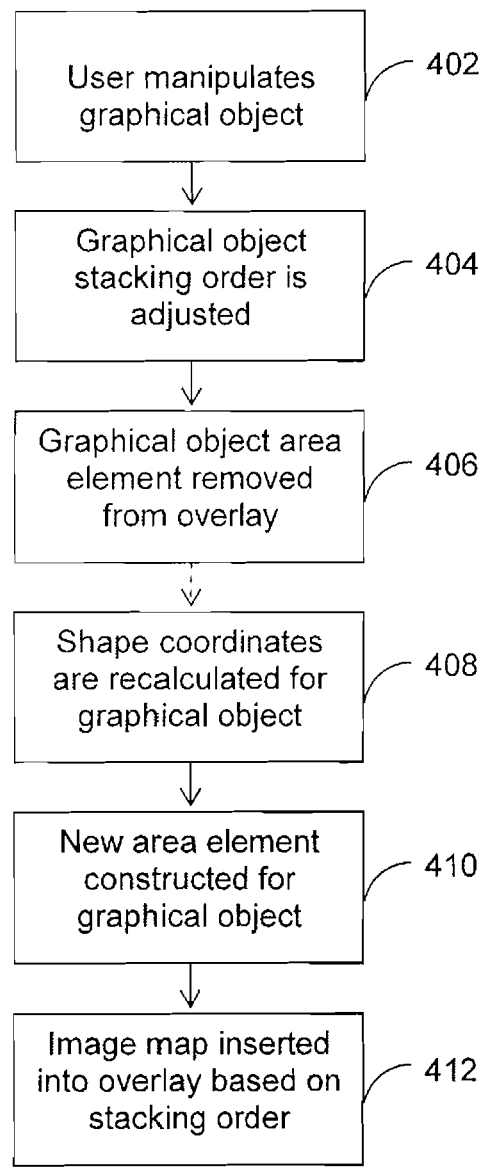
FIG. 4 is a flow chart illustrating an operating concept of an embodiment of the present invention.

An embodiment of the present invention will be described in more detail with reference to FIG. 4. In step 402, a user manipulates a graphical object within web browser based user interface 200. Methods for manipulating a graphical object may include resizing, positioning, and changing the stacking order (that is, layering), to name a few.

Once the user has manipulated a graphical object, the object's overlay stacking order may need to be adjusted (step 404). First, a sorted list may be created that determines an overlay stacking order for every graphical object in web browser based application interface 200. In one embodiment of the present invention, said list is created by sorting graphical objects based on their respective areas. Graphical objects occupying the largest amount of area are placed towards the front of the list (that is, at the bottom of the stacking order) while graphical objects occupying smaller area are placed towards the end of the list (that is, at the top of the stacking order). Such ordering by descending size will generally make objects selectable even when occluded (e.g., a small object occluded by a larger object). In a second embodiment, said list may be sorted based explicitly on the occlusion of graphical objects. In a third embodiment, said list may be sorted based explicitly on the occlusion of the computed polygonal (or other) selection approximations for the graphical objects.

In step 406, the AREA element associated with the manipulated graphical object is removed from the selection overlay. In step 408, the shape coordinates (for example, circle, rectangle, polygon to name a few) are recalculated based on the new position of the graphical object. The normalized coordinates stored as attributes on the graphical object may be used in the calculation as a possible optimization technique (as opposed to recalculating the polygon or shape approximation for a graphical object from image transparency or the like).

Based on the adjusted shape coordinates calculated in step 408, a new AREA element is created that includes the new coordinate set (step 410). In step 412, the new AREA map is added back into the image overlay.

In an embodiment of the present invention, a web browser is augmented such that web document authors are given the ability to tag certain HTML elements with one or more attributes that indicate that mouse events should be allowed to fall through to elements layered below the first said elements when certain conditions warrant (examples of such conditions are given below). In one embodiment of the present invention, first said elements may be IMAGE elements. In such an embodiment, an HTML attribute may be supported by the augmented web browser to specify that certain user interface events (e.g., mouse-in, mouse-out, or mouse-button-down, to name a few) should be conditioned on the current pointer position being over a pixel whose transparency value (alpha-channel) transparency is within some range of values (e.g., 100% or 80%-100% transparent). Where pixel values do not fall into said range, events may not be sent to the element and may instead be sent to elements lower in the document stacking order. Where pixel values do fall into said range, events may be sent to the element. In another embodiment of the present invention, a web browser is augmented such that IMAGEMAP elements have an author-specifiable attribute such that user input events from screen locations contained within any so-marked IMAGEMAP element, but not within any region defined by any AREA elements of said IMAGEMAP element, events may be sent to elements lower in the document stacking order. In another embodiment of the present invention, a web browser is augmented such that all IMAGEMAP elements have the above described behavior, in absence of an author settable attribute, or under the action of a globally author settable attribute for all IMAGEMAP (or IMAGE) elements within an electronic document 724.

FIG. 7 illustrates an exemplary operating environment 700 for a web browser program 701 and an operating environment for a web-browser based application in the context of said web browser 701 and broader environment 700. The web browser program 701, hereafter simply "web browser" 701, executes in the environment of a conventional computer 802, described in detail below. Computer 802 may be connected over a conventional network 702, which may be a local area network 864 or a wide area network 866, as described below. Computer 802 may be connected to one or more, possibly remote, computers 860, also as shown in FIG. 8 and FIG. 9, described below.

As will be understood by those with ordinary skill in the art, web browser 701 will often interface over a network such as network 702 to a remote computer running a web server application 704. It should be understood that the web server application 704 could be running on the same computer 802 as the web browser 701, and that in such an instance communication between browser 701 and server 704 can be accomplished in the absence of any network components 702 through mechanisms provided by the operating system. It should also be understood that the web browser 701 can also function in the absence of any web server 704 by accessing electronic documents from the local file system 712.

Web browser 701 will often display one or more graphical browser components 706 to the user on one or more monitors 846 connected to computer 802. Web browser may also receive user input from one or more input devices 708 connected to computer 802. Input devices 708 may often include a keyboard and a pointing device such as a mouse.

FIG. 7 further illustrates components typical to web browser applications so as to make clear a means by which an embodiment of the present invention can be delivered to the user via a web browser. Throughout this document terms such as "delivered via a web browser," "in a web browser," and "as a web browser application," are used to refer to embodiments of the present invention and similar inventions that appear to the user to form software components whose graphical displays are within graphical browser components 706 and which respond to user interaction with one or more input devices 708. These terms apply to a collection of methods, mechanisms, applications, systems, etc., regardless of where the specific bits of data or code are stored or where, how, or by what particular bits of code may be executed. For those skilled in the art, it will be clear that there are numerous possible organizations or architectures for web browser applications, some possibilities for which are given below.

FIG. 7 is further discussed so as to make clear means by which an embodiment of the present invention may be delivered in such web browser environments that are currently widely available, without augmentation, plug-ins, or extensions. It will be understood by those skilled in the art that modern web browser applications support the possibility of user-installed extensions or "plug-ins" that enhance or extend browser functionality. INTERNET EXPLORER, by Microsoft Corporation, is an example of a widely used web browser that allows users to install plug-ins. An example plug-in that can be installed into various web browsers is MACROMEDIA FLASH Player from Adobe Systems, Inc. MACROMEDIA FLASH is a vector-based animation technology for developing interactive graphical web sites, games, and presentations. MACROMEDIA FLASH technology is browser independent, and is distributed as a plug-in for web browser programs and also as a multimedia authoring program. MACROMEDIA FLASH can be installed in a web browser by downloading and running an appropriate browser plug-in installer. It will be understood by those skilled in the art that embodiments of the present invention may be operated in browsers without plug-ins as well as browsers that have been augmented with plug-ins, including, possibly, MACROMEDIA FLASH.

A modern web browser, unaugmented with additional plug-ins, may include components and capabilities such as those illustrated in FIG. 7. The browser 701 may include a graphical rendering component 714 that is capable of rendering graphical content to display devices such as monitor 846 in the form of graphical browser components 706. The rendered graphics may include such material as is commonly seen on web pages, including, but not limited to, text, images, lines, tables, and color filled regions. Browser 701 may include a user input processing component 716 capable of processing such user activity with input devices 708 that may be of interest to the browser application or other application code running therein. User input of interest that is processed by component 716 often includes keyboard activity, pointer motion within any graphical browser component 706, and pointer button press and release events within any graphical browser component 706.

The web browser 701 may also include a component capable of requesting, receiving, and sending electronic documents and other data over the network 702, should such a network be present. Such capabilities may more generally be made available through a content loading component 730 that provides a generalization of capabilities of component 728 both for remote, network based resources and for resources from the local file system 712. Content may be identified to component 712 with a universal resource locator (URL) that may refer to a local resource on file system 712 or a remote resource on server 704, for example.

Electronic documents 724 that may be retrieved by the content loading component 730 may be loaded into memory resources of computer 802 that have been allocated by the web browser 701. Such memory components often include a data cache 726, which may be in main memory and may additionally be backed to a "disk" cache in local file system 712, and may be persistent across web browser 701 invocations. Electronic documents 724 may contain markup languages, often HTML or CSS, that are processed by markup parsing component 722 of the web browser 701. In older generation web browsers, the markup parsing component may have directly established how document content such as text and graphics should be rendered to graphical components 706. In modern browsers such as web browser 701, however, markup parsing component 722 may elaborate markup to an intermediate form, document model 720, often the currently standardized document object model (DOM). The document model may then be further processed by rendering component 714 for display to graphical components 706.

Web browser 701 may also include executable code 718 that may receive events from user event processing component 716. Executable code 718 may schedule additional code to execute, asynchronously, when certain user input events occur, as detected by user event processing component 716. Executable code 718 may also interact with the content loading system to request electronic documents, to post data to remote resources, e.g., server 704, and schedule additional code to execute, asynchronously, when a request to the content loading component 730 is fulfilled. An addressable memory space 709, which may be of arbitrary size, may be provided to code 718 by web browser 701. Memory 709 may be automatically managed and garbage collected, based on resources going out of scope, by web browser 701. Document models 720, executable code 718, and associated memory 709, may be discarded by web browser 701 based on a user action such as the deselection of a previously selected electronic document 724. Executable code 718 may also interact with the document models 720, reading, writing, and modifying these document models 720, thereby effecting changes to graphical browser components 706. Executable code 718 may generate additional markup code, e.g. as a string containing HTML text, pass it for processing to the markup parsing component 722 and have it extend the document models 720 as though additional text had been added to electronic documents 724.

Executable code 718 may be delivered to the web browser 701 as electronic documents 724 or as portions (or elements within) said electronic documents. Electronic documents 724 in the form of HTML often contain embedded software in one of several languages that can be executed or interpreted by web browser 701. JAVASCRIPT is one such language that is often embedded in electronic documents and that may be interpreted by web browser 701 so as to have access to all of the above discussed capabilities of executable code 718.

A special type of resource available to web browsers and applications running therein is the browser cookie 710, a plurality of which may be stored by web browser 701, for example in local file system 712. Cookies 710 are arbitrary name value pairs, which can be stored, retrieved, and modified by name by server 704 in response to a request from web browser 701. Such a cookie 710 may be stored, on local computer 802, by web browser 701. The stored cookie may be labeled with the domain (e.g., www.amazon.com) of the originating server 704. For security reasons, web browser 701 may only allow access to cookies originating from the same domain as a server 704 requesting access. Server 704 may also specify an expiration date for each cookie 710 that it creates, and when the expiration date is reached, web browser 701 may remove the expired cookie 710 from computer 802.

Server 704 may provide various electronic documents 734 to web browser 701 based upon requests made by web browser 701. Certain electronic documents may be stored upon the server file system 732. Electronic documents 734 may be created or modified executable code 736 that runs on server 704. Such executable code may access data posted to server 704 from web browser 701, which may for example be generated from executable code 718 or user event processing 716. Server executable code may also access browser cookies 710 via web browser 701.

The APACHE HTTP Server and the APACHE TOMCAT project, both by the Apache Software Foundation, a Delaware Corporation, are open source software projects which include an implementation of a web server 704 that could provide a suitable operating environment for one or more aspects of one embodiment of the present invention. The FIREFOX browser project of Mozilla Corporation, of Mountain View, Calif. is an open source software project which includes an implementation of a web browser 701 that could provide a suitable operating environment for one or more aspects of one embodiment of the present invention.

It will be understood by those skilled in the art that the combination of capabilities provided by the components shown in FIG. 7 provide a computational environment in which software applications may be implemented and accessed by the user of computer 802. Moreover, the user may access such applications through a standard user interface, often a graphical user interface, via browser display components 706 and standard computer input devices 708 such as a keyboard or a pointing device. Moreover, it will be understood by those skilled in the art that such software applications (often called "web applications") can be delivered via electronic document from server 704 to web browser 701 without a requirement on the user to specifically install software on computer 802 (FIG. 8), e.g., adding files to local file system 712 in order to access such web applications.

With reference to FIG. 8, an exemplary system environment 800 for implementing the various aspects of the invention includes a conventional computer 802, including a processing unit 804, a system memory 806, and a system bus 808 that couples various system components, including the system memory, to the processing unit 804. The processing unit 804 may be any commercially available or proprietary processor. In addition, the processing unit may be implemented as multi-processor formed of more than one processor, such as may be connected in parallel.

The system bus 808 may be any of several types of bus structure including a memory bus or memory controller, a peripheral bus, and a local bus using any of a variety of conventional bus architectures such as PCI, VESA, Microchannel, ISA, and EISA, to name a few. The system memory 806 includes read only memory (ROM) 810 and random access memory (RAM) 812. A basic input/output system (BIOS) 814, containing the basic routines that help to transfer information between elements within the computer 802, such as during start-up, is stored in ROM 810.

The computer 802 also may include, for example, a hard disk drive 816, a magnetic disk drive 818, e.g., to read from or write to a removable disk 820, and an optical disk drive 822, e.g., for reading from or writing to a CD-ROM disk 824 or other optical media. The hard disk drive 816, magnetic disk drive 818, and optical disk drive 822 are connected to the system bus 808 by a hard disk drive interface 826, a magnetic disk drive interface 828, and an optical drive interface 830, respectively. The drives 816-822 and their associated computer-readable media provide nonvolatile storage of data, data structures, computer-executable instructions, etc. for the computer 802. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 800, and further that any such media may contain computer-executable instructions for performing the methods of the present invention.

A number of program modules may be stored in the drives 816-822 and RAM 812, including an operating system 832, one or more application programs 834, other program modules 836, and program data 838. The operating system 832 may be any suitable operating system or combination of operating systems. By way of example, the application programs 834 and program modules 836 can include an information searching scheme in accordance with an aspect of the present invention.

A user can enter commands and information into the computer 802 through one or more user input devices, such as a keyboard 840 and a pointing device (e.g., a mouse 842). Other input devices (not shown) may include a microphone, a joystick, a game pad, a satellite dish, a wireless remote, a scanner, or the like. These and other input devices are often connected to the processing unit 804 through a serial port interface 844 that is coupled to the system bus 808, but may be connected by other interfaces, such as a parallel port, a game port or a universal serial bus (USB). A monitor 846 or other type of display device is also connected to the system bus 808 via an interface, such as a video adapter 848. In addition to the monitor 846, the computer 802 may include other peripheral output devices (not shown), such as speakers, printers, etc.

It is to be appreciated that the computer 802 can operate in a networked environment using logical connections to one or more remote computers 860. The remote computer 860 may be a workstation, a server computer, a router, a peer device or other common network node, and typically includes many or all of the elements described relative to the computer 802, although for purposes of brevity, only a memory storage device 862 is illustrated in FIG. 8. The logical connections depicted in FIG. 8 can include a local area network (LAN) 864 and a wide area network (WAN) 866. Such networking environments are commonplace in offices, enterprise-wide computer networks, intranets and the Internet.

When used in a LAN networking environment, for example, the computer 802 is connected to the local network 864 through a network interface or adapter 868. When used in a WAN networking environment, the computer 802 typically includes a modem (e.g., telephone, DSL, cable, etc.) 870, or is connected to a communications server on the LAN, or has other means for establishing communications over the WAN 866, such as the Internet. The modem 870, which can be internal or external relative to the computer 802, is connected to the system bus 808 via the serial port interface 844. In a networked environment, program modules (including application programs 834) and/or program data 838 can be stored in the remote memory storage device 862. It will be appreciated that the network connections shown are exemplary and other means (e.g., wired or wireless) of establishing a communications link between the computers 802 and 860 can be used when carrying out an aspect of the present invention. Those skilled in the art will recognize that the above-described computer or a suitable variant thereof may be may be employed in a vehicle-mounted electronic device or a handheld electronic device for implementing the different embodiments of the invention.

In accordance with the practices of persons skilled in the art of computer programming, the present invention has been described with reference to acts and symbolic representations of operations that are performed by a computer, such as the computer 802 or remote computer 860, unless otherwise indicated. Such acts and operations are sometimes referred to as being computer-executed. It will be appreciated that the acts and symbolically represented operations include the manipulation by the processing unit 804 of electrical signals representing data bits which causes a resulting transformation or reduction of the electrical signal representation, and the maintenance of data bits at memory locations in the memory system (including the system memory 806, hard drive 816, floppy disks 820, CD-ROM 824, and remote memory 862) to thereby reconfigure or otherwise alter the computer system's operation, as well as other processing of signals. The memory locations where such data bits are maintained are physical locations that have particular electrical, magnetic, or optical properties corresponding to the data bits.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While there have been shown and described and pointed out certain novel features of the present invention as applied to preferred embodiments thereof, it will be understood by those skilled in the art that various omissions and substitutions and changes in the methods and apparatus described herein, and in their operation, may be made by those skilled in the art without departing from the spirit and scope of the invention. It is expressly intended that all combinations of those elements and/or method steps which perform substantially the same function in substantially the same way to achieve the same results are within the scope of the invention. Substitutions of method steps and elements from one described embodiment to another are also fully intended and contemplated. It is the intention, therefore, to be limited only as indicated by the scope of the claims appended hereto.

What is claimed is:

1. A method for use by a processor for selecting graphical objects in a web browser-based application, the method comprising:
    storing a selection overlay in a web document, the selection overlay including a transparent image encompassing a plurality of user selection regions each corresponding respectively to a different stacking layer in a web browser stacking layer, wherein each of the plurality of user selection regions is respectively associated with one of a plurality of graphical objects and defines a region of selectability for the associated graphical object, and wherein the selection overlay is a top-most layer in the web browser stacking layer on top of all the layers of the plurality of user selection regions and receives selection priority over all of the plurality of graphical objects, and wherein a first stacking layer of the web browser stacking layer providing a first graphical object of the plurality of graphical objects associated with a first user selection region of the plurality of user selection regions contained in the selection overlay is different from a second stacking layer of the web browser stacking layer providing a second graphical object of the plurality of graphical objects associated with a second user selection region of the plurality of user selection regions contained in the selection overlay;
    displaying the selection overlay including the transparent image encompassing the plurality of user selection regions using the web browser-based application;
    detecting, using the web browser-based application, an entry of a user-directed pointer into one of the plurality of user selection regions in the selection overlay;
    determining a user selection of the graphical object associated with the one of the plurality of user selection regions; and
    displaying the graphical object associated with the one of the plurality of user selection regions in response to the detecting and the determining.

2. The method of claim 1 further comprising:
    modifying the one of the plurality of user selection regions associated with the selected graphical object consistent with a user manipulation of the associated graphical object.

3. The method of claim 1 further comprising:
    generating each of the plurality of user selection regions from web browser document model elements selected from the group consisting of AREA elements, IMAGEMAP elements, and DIV elements.

4. The method of claim 1, wherein the determining of the user selection is in response to the detecting of the entry of the user-directed pointer into overlapping portions of at least two of the plurality of user selection regions associated with at least two of the plurality of graphical objects in different layers, the method further comprising:
    sorting the plurality of graphical objects by size of area occupied by each graphical object; and
    selecting one of the at least two graphical objects having a smallest area size.

5. The method of claim 1, wherein the plurality of user selection regions are AREA elements in a plurality of IMAGEMAP elements.

6. The method of claim 1, wherein at least one of the plurality of graphical objects occupies a non-simply connected region and the associated selection region is a simply connected polygon.

7. An article of manufacture, comprising:
    a non-transitory computer readable medium having stored thereon instructions that when executed by a processor perform the steps including:
        storing a selection overlay in a web document, the selection overlay including a transparent image encompassing a plurality of user selection regions each corresponding respectively to a different stacking layer in a web browser stacking layer, wherein each of the plurality of user selection regions is respectively associated with one of a plurality of graphical objects and defines a region of selectability for the associated graphical object, and wherein the selection overlay is a top-most layer in the web browser stacking layer on top of all the layers of the plurality of user selection regions and receives selection priority over all of the plurality of graphical objects, and wherein a first stacking layer of the web browser stacking layer providing a first graphical object of the plurality of graphical objects associated with a first user selection region of the plurality of user selection regions contained in the selection overlay is different from a second stacking layer of the web browser stacking layer providing a second graphical object of the plurality of graphical objects associated with a second user selection region of the plurality of user selection regions contained in the selection overlay;

displaying the selection overlay including the transparent image encompassing the plurality of user selection regions using the web browser-based application;

detecting, using the web browser-based application, an entry of a user-directed pointer into one of the plurality of user selection regions in the selection overlay;

determining a user selection of the graphical object associated with the one of the plurality of user selection regions; and displaying the graphical object associated with the one of the plurality of user selection regions in response to the detecting and the determining.

8. The article of manufacture of claim 7, wherein the steps further comprise:
modifying the one of the plurality of user selection regions associated with the selected graphical object consistent with a user manipulation of the associated graphical object.

9. The article of manufacture of claim 7, wherein the steps further comprise:
generating each of the plurality of user selection regions from web browser document model elements selected from the group consisting of AREA elements, IMAGEMAP elements, and DIV elements.

10. The article of manufacture of claim 7, wherein the determining of the user selection is in response to the detecting of the entry of the user-directed pointer into overlapping portions of at least two of the plurality of user selection regions associated with at least two of the plurality of graphical objects in different layers, the steps further comprise:
sorting the plurality of graphical objects by size of area occupied by each graphical object; and
selecting one of the at least two graphical objects having a smallest area size.

11. The article of manufacture of claim 7, wherein the plurality of user selection regions are AREA elements in a plurality of IMAGEMAP elements.

12. The article of manufacture of claim 7, wherein at least one of the plurality of graphical objects includes at least two of the plurality of user selection regions that are not connected.

13. An electronic system, comprising:
a memory;
a processor coupled to the memory;
a user-input device coupled to the processor;
wherein the memory is configured with instructions that when executed by the processor select a graphical object in a web browser-based application by performing the steps including:
storing a selection overlay in a web document, the selection overlay including a transparent image encompassing a plurality of user selection regions each corresponding respectively to a different stacking layer in a web browser stacking layer, wherein each of the plurality of user selection regions is respectively associated with one of a plurality of graphical objects and defines a region of selectability for the associated graphical object, and wherein the selection overlay is a top-most layer in the web browser stacking layer on top of all the layers of the plurality of user selection regions and receives selection priority over all of the plurality of graphical objects, and wherein a first stacking layer of the web browser stacking layer providing a first graphical object of the plurality of graphical objects associated with a first user selection region of the plurality of user selection regions contained in the selection overlay is different from a second stacking layer of the web browser stacking layer providing a second graphical object of the plurality of graphical objects associated with a second user selection region of the plurality of user selection regions contained in the selection overlay;

displaying the selection overlay including the transparent image encompassing the plurality of user selection regions using the web browser-based application;

detecting, using the web browser-based application, an entry of a user-directed pointer into one of the plurality of user selection regions in the selection overlay;

determining a user selection of the graphical object associated with the one of the plurality of user selection regions; and displaying the graphical object associated with the one of the plurality of user selection regions in response to the detecting and the determining.

14. The electronic system of claim 13, wherein the steps further comprise modifying the one of the plurality of user selection regions associated with the selected graphical object consistent with a user manipulation of the associated graphical object.

15. The electronic system of claim 13, wherein the steps further comprise generating each of the plurality of user selection regions from web browser document model elements selected from the group consisting of AREA elements, IMAGEMAP elements, and DIV elements.

16. The electronic system of claim 13, wherein the determining of the user selection is in response to the detecting of the entry of the user-directed pointer into overlapping portions of at least two of the plurality of user selection regions associated with at least two of the plurality of graphical objects in different layers, the steps further comprise:
sorting the plurality of graphical objects by size of area occupied by each graphical object; and
selecting one of the at least two graphical objects having a smallest area size.

17. The electronic system of claim 13, wherein the plurality of user selection regions are AREA elements in a plurality of IMAGEMAP elements.

* * * * *